A. L. GENTER.
FILTERING PROCESS.
APPLICATION FILED JAN. 23, 1917.
1,269,700.
Patented June 18, 1918.
2 SHEETS—SHEET 2.
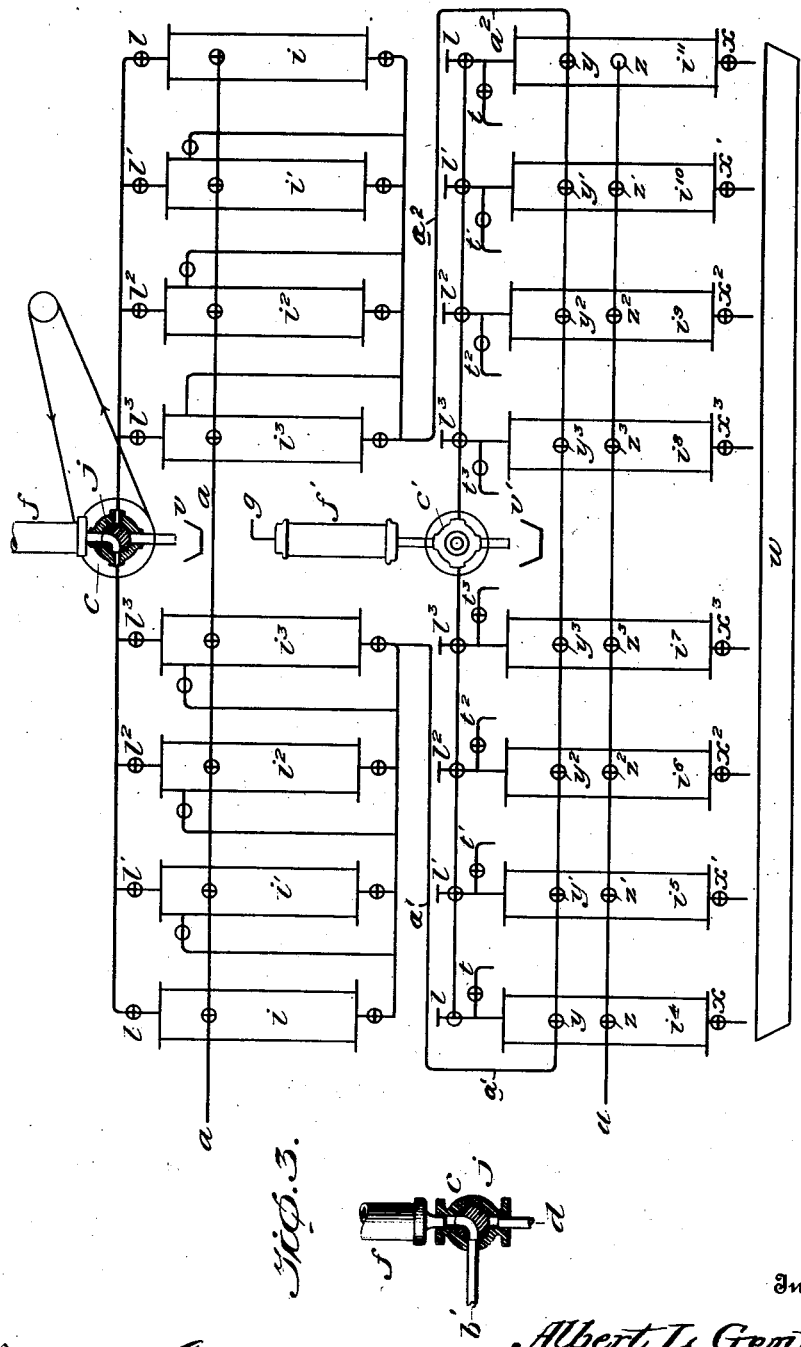
Inventor
Albert L. Genter.
By T. Walter Fowler
Attorney

UNITED STATES PATENT OFFICE.

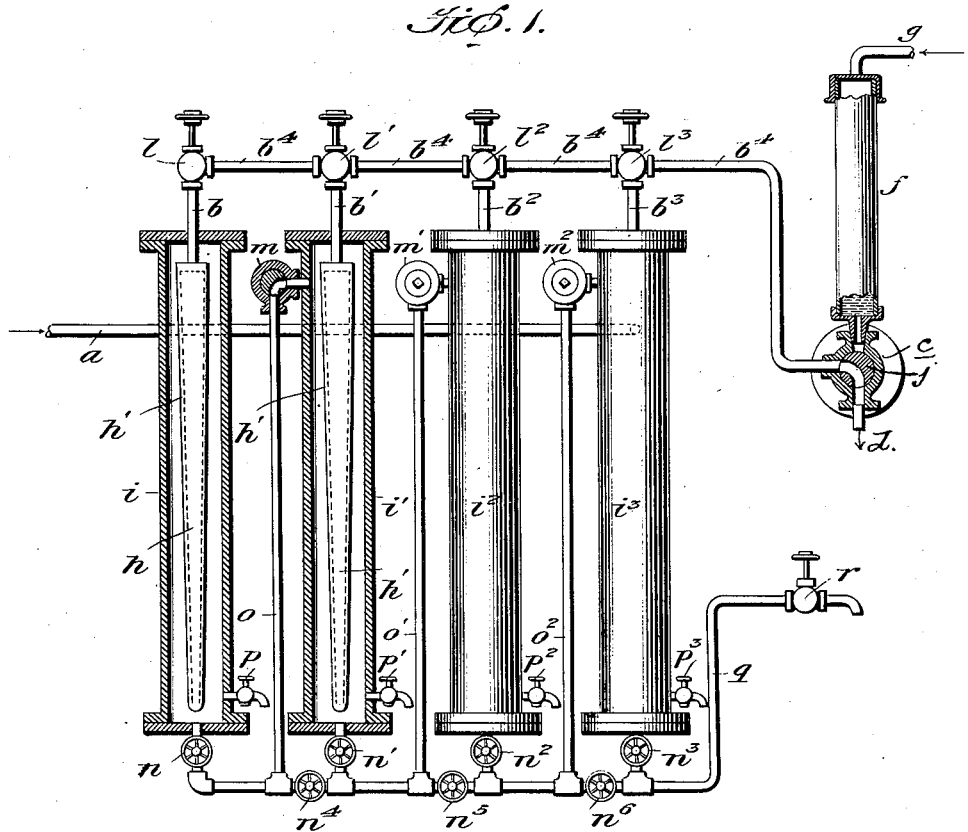
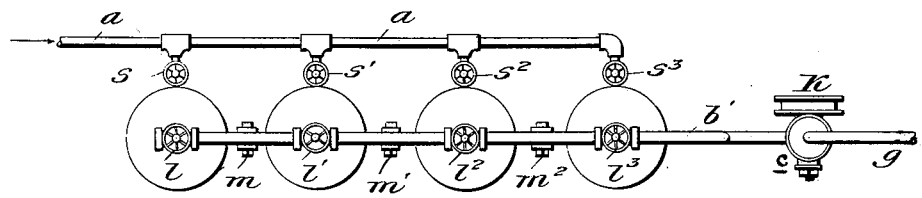

ALBERT LEGRAND GENTER, OF SALT LAKE CITY, UTAH, ASSIGNOR OF ONE-HALF TO THE GENERAL ENGINEERING COMPANY, OF SALT LAKE CITY, UTAH, A CORPORATION OF UTAH.

FILTERING PROCESS.

1,269,700.   Specification of Letters Patent.   Patented June 18, 1918.

Application filed January 23, 1917. Serial No. 143,935.

*To all whom it may concern:*

Be it known that I, ALBERT L. GENTER, a citizen of the United States, residing at Salt Lake City, in the county of Salt Lake and State of Utah, have invented certain new and useful Improvements in Filtering Processes, of which the following is a specification.

My invention relates to a process for the rapid separation of solids from clear liquids through a continuous filtration operation that delivers a continuous stream of clear filtrate while the mixture being filtered is gradually thickened into a thick pulp or paste that contains very little liquid, substantially as I will hereinafter describe and claim.

It is not the object of this invention to produce a firm filter press cake at the outset, as is usual in all filter presses. In obtaining the continuous stream of filtrate, the mixture of solids and unfiltered liquids is continuously or progressively thickened to such an extent that it can be delivered to final filter presses of any type or the final thickened product can be used as is seen fit without further filtration. If final separation of the thickened product into compact filter press cake and the remaining liquids is necessary, it will be found with my process that this final filtration can take place over a much smaller filter area than has heretofore been practical in a great many branches of the chemical and metallurgical industries.

It is a well known fact in filtration that to force a large quantity of liquids through a small percentage of solids requires a large amount of area because the solids deposited on the filter medium through filtration offer the main resistance to the free passage of the filtrate, and this resistance increases as filtration proceeds and the solid particles pack in tightly over the previous deposits so that after some time the unit of filtrate outflow drops during the unit of time, thus causing a corresponding drop in the rate of separation. As a consequence, a large amount of area and power, as well as labor, is required for a large filtrate output. As a result of this various devices have been patented and are being used for thickening the mixture to be sent to the filter presses, or to the other final treatment devices, by settling the solids and decanting off as much of the clear or semi-clear liquid as is possible before final separation. The decanted liquids are not always clear enough and have to be filtered by themselves, but the thickened mass can always be filtered or further treated without entailing the treatment of the entire liquids with the solids. In filtering such a thickened mass, the rate of solid deposit is much more rapid because the percentage of solids to liquids is materially increased and during the time a unit of filtrate is forced through the filter medium, a larger unit of solids is deposited on the medium than is usual in filtering the dilute mixture.

In some industries decantation is practically impossible as a clean separation of clear liquid from a thickened mass will not result because the particles held in suspension are so light that settling and decantation would require time and immense decantation areas beyond all economic means. Furthermore, if the liquids or mixtures are to be kept hot and rapidly handled, as in the sugar industries, or cold as with oils and paraffins or other chemical mixtures, the added expense of keeping the mixture hot or cold would make decantation economically impossible. In fact, wherever decantation tanks, thickeners, or settling methods are used with advantage, my invention offers greater advantages of quicker and cleaner separation in a much smaller space and much less initial and operating cost.

The principle of my separation process is primarily described in Letters Patent No. 1,214,152 granted to me January 30, 1917, where it is my main intention to cleanse the filter medium and facilitate the filtering function thereof by alternately directing in substantially rapid succession filter current against one side of the filter medium and a cleansing current against the opposite side of said medium. In this invention I have merely shown the idea of cleansing the filtering medium in order to secure a larger output of filtrate than is usual in all filter press practice where the filter press cake is packed over the filter medium by continued hydraulic pressure from the outset of filtering operations.

In using the present process, I have found that if the gradually thickened product in the filter chamber be continually drawn off during the filtering and cleansing procedure and retreated in a following chamber where a similar separation takes place, the mixture being filtered will be further thickened in this second chamber, and if the further thickened mixture in this chamber be carried to a third chamber where it is still further thickened and so on in a fourth, fifth and further chambers if necessary, the filtrate from each chamber being conveyed to a common pipe and rotating or pulsating valve or through individual pulsating valves, the operation can be carried on continually as the filter elements in each chamber will be continually kept free of cake and a more or less continuous outflow of filtrate will result. The final thickened product from the last chamber can then be fed directly to any kind of a filter that is thought necessary or deposited in cake-form on the filter element or elements in the final chambers, washed if necessary, and then pulsated from the elements and withdrawn as final thickened product.

For some mixtures one or two chambers may be necessary; for others containing colloids or a large percentage of liquids and a small percentage of solids, a series of three, four, or many more may be necessary. The use of a larger number of chambers will particularly be necessary where it will be advisable to make the chambers of such dimensions that the gradually thickened mixture will proceed through the same at a high velocity in order to rapidly carry away any deposit that may tend to form over the filter medium and obstruct its free permeability.

It will be seen from the foregoing that my present invention can be carried out in any type of present filtering device that is equipped with the proper inlet and continuous outlet for the mixtures being filtered, as well as with the proper rotating or pulsating valve mechanism on the filtrate outlets. In fact by means of this novel process, old periodically-operated filter presses of any make can be converted into continuously operated devices by attaching very simple mechanisms that will result in automatically cleansing the filter medium and so connecting the various filter bodies or chambers that the gradually thickened mixture proceeds from one to the other as is desired.

In the accompanying drawing I disclose apparatus by the employment of which my process may be carried out.

Figure 1 is a side elevation of one type of apparatus having four filter chambers continuously connected.

Fig. 2 is a plan view of Fig. 1 showing the inlets for the mixture being filtered.

Fig. 3 is a sectional detail of a rotating valve hereinafter described.

Fig. 4 is a diagrammatic illustration of several units continuously connected together with facility for making solid cakes and washing the same free of any retained values in the final chambers.

Although specific mechanisms are shown in Figs. 1, 2 and 4, for carrying out my process, I wish it understood that I do not confine my present process of separating liquids from solids to these or to any particular arrangements and forms of apparatus, but that I may employ any apparatus capable of carrying out the process.

Referring to Fig. 1, the filter chambers $i$, $i'$, $i^2$, $i^3$ are all similar and shown in their simplest form. Each contains a filter element, $h$, which in this case may be a bag of any filter fabric drawn over a perforated pipe, these pipes connecting through the cover of the chamber, by means of filtrate outlets, $b$, $b^1$, $b^2$, $b^3$, which in turn are connected by means of angle or cross valves, $l$, $l'$, $l^2$, $l^3$ to a common filtrate header, $b^4$, which in turn is connected finally to a rotating or pulsating valve, $c$. The principles and purpose of this valve are more fully set forth in Patent Number 1,214,152 granted to me January 30, 1917. The material to be filtered is forced into the pressure or filter chamber, $i$, through the ordinary means by way of pipe or passage $a$, which as shown in Fig. 2, is connected to the filter chambers through valves, $s$, $s^1$, $s^2$, $s^3$, respectively. This permits cutting any filter chamber out of service at will, in case of repairs.

In operation, if the inlet valve, $s$, connecting to inlet header $a$, be left open and the other inlet valves, $s^1$, $s^2$, and $s^3$ be closed and the material to be filtered be forced into the supply pipe, $a$, then through the open valve, $s$, into the first chamber, $i$, under pressure, the filtrate will penetrate the sides, $h^1$ of the filter element, $h$, and pass out through the pipe $b$, then through the open valve, $l$, through header $b^4$, and finally through the open position of the rotating plug, $j$, of the valve, $c$, and then to the discharge opening, $d$, as shown. If the plug $j$, of the valve, $c$, be now switched or rotated into the position shown in Fig. 3, and then to the original position and so on, the pulsating shock action, consisting of alternately directing in substantially rapid succession the filter current against one side of the filter medium, $h^1$, and back pressure cleansing current against the opposite side of said medium, will result in an intermittent delivery of filtrate out of the discharge, $d$, and the cleansing of the filter medium, $h^1$, more fully described in the patent above referred to.

If the filter chamber $i$, be given the proper form, it will be seen that the deposit that is pulsated from the filter medium, $h^1$, or is but loosely adhering to the same during this procedure, can be carried with a current of unfiltered material into the following chamber, $i^1$, through an opening in the bottom of chamber $i$, then through valve, $n$, pipe, $o$, valve, $m$, and into chamber $i^1$. As the unfiltered material in passing from chamber $i$, into chamber $i^1$ is under pressure, and is freed of some of its liquid contents through the filtration procedure already described, it will be seen that it has become richer in solids.

In chamber $i^1$, the same partial separation takes place as the filter element in this chamber is covered with the same medium and connected in the same manner to the pulsating outlet valve.

The material to be filtered then being still richer in solids and poorer in liquids through the cleansing action and filtration in chamber $i^1$ flows on out of the bottom of this chamber through the valve, $n^1$, pipe $o^1$, valve, $m^1$, to chamber $i^2$, where it becomes still richer in solids through the further filtration and cleansing action. This thickened unfiltered product then passes out of chamber $i^2$, through the bottom outlet, through valve $n^2$, pipe $o^2$, valve $m^2$, into a further chamber, and so on. As the filtration pressure is back of the unfiltered material it will continuously pass from one chamber to a following one and through as great a number of chambers as is found necessary, losing some of its liquid content in each chamber and becoming gradually richer in solids, until the final thickened product leaves the final chamber through proper outlet, $q$ and $r$. This product may be drawn off in such a consistency that the filtration pressure will just make it flow. It can then be further treated as is seen necessary as it has lost the greater portion of its original liquid contents. If it is desired to remove the final value-bearing liquid from the solids, or if the solids need be obtained in their purest form, free of all admixed liquid, the thickened mass can be further filtered and washed in any ordinary filter or the procedure shown in Fig. 4 can be further adopted.

As the filter elements with filter medium shown in Figs. 1 and 2 may wear out or clog through chemical incrustations in time, it will be necessary to cut out any one of the filter chambers without interrupting the continuous separation of solids and liquids. For this purpose I have shown the valves, $s$, $s^1$, $s^2$, $s^3$, $n$, $n^1$, $n^2$, $n^3$, $m$, $m^1$, $m^2$, $l$, $l^1$, $l^2$, $l^3$ and $p$, $p^1$, $p^2$, $p^3$, $n^4$, $n^5$ and $n^6$.

If for instance, the chamber $i^2$ is to be cut out of the series, the cross valve $l^2$ is closed down so that no filtrate from the filter element in the chamber, $i^2$, can be forced into the header, $b^4$. Then the valves $m^1$ and $n^2$ are closed and the valve $n^5$ is opened. This disconnects the chamber $i^2$ from the pressure system. The filter element can now be removed and the contents of the chamber $i^2$ can be drained out through the valve $p^2$. During this time the unfiltered material from the chamber $i^1$, passes to the chamber $i^3$. As soon as repairs have been completed on the chamber $i^2$, it is again cut into the series by opening the valves $l^2$, $m^1$, and $n^2$, and closing the valves $p^2$ and $n^5$. Of course, various piping arrangements can be made to cut any one element and chamber from the entire continuous system and also to drain the contents of any one chamber upon so doing. The chambers can also be so interconnected that the filtration procedure can be reversed in the entire series if necessary. In any of these cases the fundamental thickening process here described will be adhered to.

In Fig. 4 still another continuous battery arrangement of chambers, filter elements, and pulsating valves is shown diagrammatically.

The upper right and left hand series or batteries of chambers $i$, $i^1$, $i^2$, $i^3$, are connected from both sides to the plug $j$ of the rotating four-way cock $c$, so that filtrate is discharged into a common outlet. The thickened unfiltered material from the upper right and left hand batteries passes from the same to the lower individual chambers through the pipes $a^1$ and $a^2$. Here the material can be further thickened through the continuous filtering and cleansing action in all chambers at once, finally flowing into a receiver, $w$, in a very thick paste, or if the solids are to be obtained entirely free of admixed liquids by replacing these liquids by water or some other liquid not harmful to the further process, the following procedure may be resorted to.

For instance, the thickened products from the upper right and left hand continuous series is forced through the pipes, $a^1$ and $a^2$, into the chambers $i^4$ and $i^{11}$ through the valves $y$, on both these chambers being open; the other lower chamber being not in use at this time. The filtrate outlet valves $l$, on these operating chambers $i^4$ and $i^{11}$ are closed so that there is no pulsating cleansing action, and the valves $t$, are opened. As a consequence the thickened mixture entering right and left hand chambers will be separated as in ordinary pressure filtration in these chambers, giving a clear filtrate through valves $t$, corresponding to the rate of flow of the whole unfiltered mass through the entire system, and a solid filter cake will be easily formed in the two right and left hand chambers $i^4$ and $i^{11}$, as the solids are not pulsated from the sides of the elements in these chambers, the valves $l$, on the right and left being closed, the valves $t$, being open. As soon as a cake of sufficient thickness has been formed in the chambers $i^4$ and $i^{11}$, the valves $y$, are closed, and the valves $z$, connecting to wash water under pressure in the line $u$, are opened. The wash water now is forced into the chambers $i^4$ and $i^{11}$, and if the cake practically fills most of the space in these chambers, the wash water will have to displace very little unfiltered liquid out of the chamber before displacing the retained moisture values left in the case. During this procedure, the chambers $i^5$ and $i^{10}$ are connected to the lines $a^1$ and $a^2$, so that thickening and filtration may proceed continuously. As soon as cakes in the chambers $i^4$ and $i^{11}$ are washed, the valves $t$ are closed, and the filtrate valves $l$, connecting the interior of the elements in chambers $i^4$ and $i^{11}$ to the pulsating cleansing valve $c^1$, are opened and the washed cakes pulsated from the filter mediums on the elements in these chambers. As the valves $z$ are also opened during this cleansing procedure, the washed cake will be forced out through the valves $x$, which are now also opened, into the receiver or conveyer $w$. Soon the chambers $i^4$ and $i^{11}$ will be empty and will be again ready for use.

As soon as cakes are formed in the chambers $i^5$ and $i^{10}$ they are also washed and pulsated into the receiver $w$, as already described, and in the meantime other chambers are cut into the continuous process of extracting the final liquid from the final thickened product. The washed cake that is pulsated from the final chambers is naturally mixed with water. If it is desired to obtain this cake again in solid form, it can be filtered again in any filter press that will produce a firm dry cake. The advantage is that this refiltered cake does not need to be washed free of any further values in the filter presses used.

In order to remove the liquid from the thickened product it is not absolutely necessary to first deposit the solids in cake form in the final chambers and then wash the original liquid from this cake by means of water. This can also be easily accomplished while the thickening proceeds by gradually adding water to the thickened mass as it passes through the final chambers. This at first dilutes the mass, but as it passes through further chambers where filtrate is gradually and continuously being drawn off and water is being added, it will be seen that the mass will ultimately contain solids and wash liquid instead of solids and the original liquid. For this purpose, all that is necessary is to leave the water pipe $u$, (Fig. 4), connected to the lower series of chambers as shown, and interconnect the lower series of chambers so that the mixture being thickened will flow from one chamber to another as is the case with the upper right and left hand series of chambers, more fully shown in Fig. 1.

The valves $z$, $z^1$, $z^2$, and $z^3$, can be left open so that each following valve is somewhat wider open or somewhat more throttled than the foregoing valves if necessary. As the thickened mass proceeds through the lower chambers, the water will then dilute the mixture and pass out with the filtrate, and if the valves are properly regulated nothing but water or wash liquid and solids will be contained in the thickened mass issuing from the final chamber or chambers.

My thickening and continuous filtration process will be of further value to the sugar industry for instance, in that it will entirely do away with secondary filter stations where special presses are at present required, although very little solids are collected in these secondary press stations through which a great amount of sugar juice passes on its way through the sugar mill. A battery of pulsating chambers will deliver a continuous juice outflow from the second and third filter stations and the small amount of thickened product that continually leaves these pulsating chambers can be carried back to the primary filter stations equipped with my continuous process, where the main bulk of solids is being removed from the sugar juices, in the first purification steps.

In the extraction of sugar juices from sugar cane, my process will also do away with the settling systems and the very difficult filtration that results in treating these juices. In fact it will be found of great advantage everywhere it is necessary to separate liquids from solids that remain long in suspension, or solids that are colloidal or in any way difficult to filter.

Having thus described my invention what I claim as new and desire to secure by Letters Patent is:—

1. The process of continuously filtering and thickening the mixture being filtered, said process consisting essentially, in cleansing a filter medium *in situ* and utilizing the current of the mixture in one chamber to collect the solids cleansed from a filter medium therein and to convey the same to a succeeding filter chamber; and repeating the filtering and cleansing operations in said second filtering chamber.

2. The process substantially as herein described, of continuously filtering and thickening the mixture being filtered, said process consisting, essentially, in alternately directing in substantially rapid succession the filter current against one side of said filter medium and a cleansing current against the opposite side of said medium in a filter chamber, and utilizing the current of the mixture being filtered in said chamber to collect the solids cleansed from the said medium and convey the same to a following chamber, where the filtering and cleansing action is substantially simultaneously carried on.

3. The process substantially as herein described, of continuously filtering and thickening the mixture being filtered, said process consisting, essentially, in alternately directing in substantially rapid succession the filter current against one side of said filter medium and a cleansing current against the opposite side of said medium in a filter chamber; utilizing the current of the mixture being filtered in said chamber to collect solids cleansed from the said medium and to convey the same to a following chamber; and repeating the filtering and cleansing operations in said following chamber.

4. The process substantially as herein described, of continuously filtering and thickening the mixture being filtered, said process consisting, essentially, in alternately directing in substantially rapid succession the filter current against one side of the filter medium and a cleansing current against the opposite side of said medium, in a filter chamber; progressively thickening the mixture by causing the current thereof, to combine with and convey the separated solids of one chamber to successive chambers; and repeating the filtering and cleansing operations in each of the latter chambers.

5. The process substantially as herein described, of continuously filtering and thickening the mixture being filtered, said process consisting, essentially, in alternately directing in substantially rapid succession the filter current against one side of said medium and a cleansing current against the opposite side of said medium, in a filter chamber, while the current of the mixture being filtered in this chamber collects the solids cleansed from said medium; flowing the mixture to successive chambers and utilizing the current of the mixture to convey to a succeeding chamber the solids of a preceding chamber; and repeating the filtering and cleansing operations in the successive chambers.

6. The process substantially as herein described, of continuously filtering and thickening the mixture being filtered, said process consisting, essentially, in continuously cleansing a filter medium by directing the filter current against one side of said medium, to cause a deposit of solids thereon, and directing a cleansing current against the opposite side of said medium to displace said solids; utilizing the current of the mixture being filtered in one chamber to collect the displaced solids and convey the same to a succeeding chamber; and repeating the filtering and cleansing operations in said latter chamber.

7. The process substantially as herein described, of continuously filtering and thickening the mixture being filtered, said process consisting, essentially, in directing the filter current against one side of said filter medium, to cause a deposit of solids thereon; washing the solids while in place on the filter medium; directing a cleansing current against the opposite side of said medium to dislodge the washed solids; utilizing the current of the mixture being filtered in one chamber to collect the dislodged solids and convey the same to a succeeding chamber; and repeating the filtering and cleansing operations in said succeeding chamber.

8. The process substantially as herein described, of continuously filtering and thickening the mixture being filtered, said process consisting, essentially, in alternately directing the filter current against one side of said filter medium and a cleansing current against the opposite side of said medium in a filter chamber, thereby pulsating the filter medium; utilizing the current of the mixture being filtered in said chamber to collect the solids dislodged from the filter medium, and flowing the mixture with the added solids to successive chambers; repeating the filtering and cleansing operations in said successive chambers; and adding a washing fluid to the gradually thickened mass passing through the chambers to recover any retained values and obtaining a final mixture of solids and a wash-liquid substantially devoid of original liquid content.

9. The process of continuously filtering and thickening the mixture being filtered, said process consisting, essentially, in imparting a positive movement to opposite sides of a filtering medium alternately in each of a series of connected chambers thereby first collecting solids on filter mediums in said chambers and then dislodging said solids; and utilizing the current of the mixture passing through the chambers as a carrier for displaced solids of each chamber and thereby conveying to the successive chambers the solids of a preceding chamber, the mixture being progressively enriched in solid content.

In testimony whereof I affix my signature.

ALBERT LEGRAND GENTER.